United States Patent [19]

Leppänen et al.

[11] Patent Number: 5,665,211

[45] Date of Patent: Sep. 9, 1997

[54] ELECTROLYSIS APPARATUS FOR PRODUCING HYDROGEN

[75] Inventors: Jyrki Leppänen, Helsinki; Jukka-Pekka Nieminen, Porvoo, both of Finland

[73] Assignee: Neste Oy, Espoo, Finland

[21] Appl. No.: 392,939

[22] PCT Filed: Aug. 31, 1993

[86] PCT No.: PCT/FI93/00343

§ 371 Date: Apr. 20, 1995

§ 102(e) Date: Apr. 20, 1995

[87] PCT Pub. No.: WO94/05830

PCT Pub. Date: Mar. 17, 1994

[30] Foreign Application Priority Data

Aug. 31, 1992 [FI] Finland .................... 923904

[51] Int. Cl.$^6$ .................... C25B 1/12; C25B 9/00; C25B 15/08

[52] U.S. Cl. .................... 204/237; 204/266; 204/278; 204/275

[58] Field of Search .................... 204/242, 237, 204/275, 265–266, 277–278

[56] References Cited

U.S. PATENT DOCUMENTS 3,382,167  5/1968  Lord et al. .................... 204/270
4,358,357  11/1982  Pere .................... 204/258

Primary Examiner—Donald R. Valentine
Attorney, Agent, or Firm—Steinberg, Raskin & Davidson, P.C.

[57] ABSTRACT

In an electrolysis apparatus according to the invention for producing hydrogen by decomposing electrolysis liquid with the aid of electric current into hydrogen and oxygen in a pressurized electrolytic cell (11), an electrolytic cell (11) is placed within a liquid-filled pressure shell (10) maintained pressurized with the pressure of a gas produced in electrolysis. The liquid can be selected, for instance, among the following group: silicon oils or fats, fluorized oils, crude oil-based or synthetic oils, or water.

14 Claims, 2 Drawing Sheets

ELECTROLYSIS APPARATUS FOR PRODUCING HYDROGEN

FIELD OF THE INVENTION

The present invention relates to an electrolysis apparatus for producing hydrogen by decomposing electrolytic liquid into hydrogen and oxygen in a pressurized electrolytic cell.

BACKGROUND OF THE INVENTION

Hydrogen is an ideal and non-polluting source of energy in special applications in which no conventional energy sources are available. Therefore, for instance, in devices using electric current and located in sparsely populated and rough regions, photovoltaic modules can be used for producing electric current. Such installations are frequently unmanned and require automatic or remote control operation. Also, such installations have to be operated when there is no sunlight. Storing electricity merely in batteries would require a large number of batteries, which are heavy in weight and require maintenance.

Using hydrogen for storing energy is one of the means to recover the surplus energy produced by solar cells, whereby water is decomposed into hydrogen and oxygen. Thereby, electricity may, if needed, be produced with the aid of a fuel cell from hydrogen. In order to reduce the size of the hydrogen storages required, the hydrogen must, however, be pressurized, and additional energy must be used in the pressurization.

It is known in the art to accomplish the decomposition of water into hydrogen and oxygen in electrolytic cells operating under pressure and thus producing hydrogen directly in pressurized form, so that no separate pressurization is needed. However, increased leakage is a drawback of pressurizing electrolytic cells.

It is also known in the art to place an electrolytic cell into a separate pressure shell, whereby the differential pressure between the inside and outside of the electrolytic cell substantially reduces and the leakages decrease. Thus, in an apparatus as for instance, in patent publication FR-2466515, the pressure shell is pressurized with the aid of nitrogen gas, and the apparatus comprises members for maintaining the pressure within the electrolytic cell lower than the pressure of the pressure shell. Use of separate pressurizing gas requires, however, containers for the pressurizing gases and need for supplementing the pressurizing gas. Thus, the system disclosed in the patent is not suitable for installations operating e.g. automatically in remote areas.

It is known from GB patent No. 1518234 to place the electrolytic plates inside a pressure shell, whereby the pressure of hydrogen gas prevails inside the pressure shell. However, in the design according to said patent, there is not a closed electrolyric cell placed within a pressure shell, but the electrodes used in decomposing an electrolytic liquid (HCl) are positioned to be hanging directly inside the pressure shell. The apparatus disclosed in GB patent No. 1518234 is an apparatus intended for large-scale production of hydrogen, having a great need of power, a complicated and expensive design, e.g. due to apparatus needed in purification.

In the Finnish patent application FI-923903, an electrolysis apparatus is disclosed for producing hydrogen from water; in which apparatus, an electrolyric cell is placed inside a pressure shell and in which the pressure shell is pressurized by conducting oxygen produced in the electrolysis into the pressure shell. The great compressibility of gas causes, however, that the control of the pressure may be slow because the volume of the mantle can be great, particularly if within the pressure shell also other devices are placed in addition to the electrolytic cell, such as water separators. Oxygen may, moreover cause, for instance, electrochemical corrosion in moist spaces, for instance in a space between the mantle and the electrolytic cells.

SUMMARY OF THE INVENTION

The present invention relates to a pressurized electrolysis apparatus used for producing hydrogen in which drawbacks occurring in the systems as those described above have been solved, and which can be advantageously applied in automatic solar energy applications operating without surveillance and continuous maintenance.

The electrolysis apparatus according to the invention for producing hydrogen by decomposing an electrolytic liquid with the aid of electric current into hydrogen and oxygen in a pressurized electrolytic cell is characterized in that a closed electrolytic cell is placed in a pressure shell maintained pressurized with the aid of the pressure of a gas produced in electrolysis.

The electrolytic liquid fed into the electrolytic cell contains water, but it may contain any auxiliary substances promoting the operation of the electrolytic cell used, such as acids or bases. The term "water" will below refer to any such electrolytic liquid.

In an apparatus according to the invention, normal advantages provided by pressurization are gained, i.e. the occurrence of leakages from the electrolytic cell can be minimized. In addition, a great number of other advantages are achieved with the aid of the invention. With the aid of the present invention, pressurization with variable pressures can be provided without having to use a separate protective gas for the pressurization and the control thereof. The amount of gas required in pressurization is very small. It is to be noted particularly that in the apparatus of the invention, not only hydrogen produced in the electrolytic cell can be used for the pressurization gas but also oxygen without any risk of corrosion.

In the most common embodiment of the invention, the electrolytic cell is placed within a pressure-resistant pressure shell, and the pressure shell is filled with a liquid. In addition, the pressure shell is connected with a pipe or equivalent to the pressure gas source, this being a gas produced in the electrolytic cell. Naturally, either oxygen or hydrogen may be used as pressurizing gas. The pressure shell is preferably entirely filled with a liquid, whereby the inertia of the control caused by the compressibility of the gas can be avoided, which may occur if only gas were used for the pressurization of the pressure shell.

In the pressure shell, any liquid can be used which is non-conducting, inert to hydrogen or oxygen, non-corroding for the materials used, and resistant to working temperature conditions. The price and non-toxicity are also aspects to be considered.

Thus, in the apparatus of the invention, for instance, silicon oil or fats, fluorized oils, oil-based or synthetic lubricants, distilled or ion-exchanged water, or mixtures of any one mentioned can be used for the pressurization liquid. The problem of the last mentioned substance is, however, its poor frost-resistance, and that it may cause electrochemical corrosion, especially in association with oxygen. Conventional hydrocarbon containing oils cannot be used with oxygen, either.

Examples of pressurization liquids particularly appropriate also for use with oxygen are especially silicon oils and fats, such as "Dow Corning 200 Fluid" manufactured by Company Dow Corning or "Rhodosil" oil by Company Rhone-Poulenc.

It is conventional that the hydrogen gas and the oxygen gas from the electrolytic cell are first conducted through water separators for separating the water following the gases. The water separators in the apparatus, according to the invention, can be preferably placed within the pressure shell, whereby the water separators need not be pressure-resistant. However the water separators are preferably placed outside the pressure shell so that the volume of the pressure shell and the volume of the requisite pressurization liquid is as small as possible.

The water separated in the water separators from the gases is returned into the electrolytic cell. According to one advantageous procedure, the water from the water separator of the hydrogen gas is conducted to the water separator of the oxygen gas, from which the water is returned into the electrolytic cell. Hereby, the water separator of the hydrogen gas can be provided with a liquid surface height sensor to control the valve placed in the water return line. As the surface rises to the top height, the valve opens, and the water is able to flow from the water separator of the hydrogen gas to the water separator of the oxygen gas. After the surface has gone down into the lower height, the valve shuts down.

As mentioned in the foregoing, the liquid-filled interior space of the pressure shell is connected for instance with a pipe to a gas source provided by a hydrogen or oxygen gas under pressure produced in the electrolytic cell. Therefore, the pressure shell can be in conjunction with any point which is located in the pipes between the gas containers and the electrolytic cell. According to an advantageous alternative, the pressure shell is by means of a pipe connected with the upper part of the water separator used in the water removal from a gas. The pressurization liquid is preferably used in such quantity that the liquid surface rises at least to some extent into the pipe between the pressure shell and the gas pressure source, however considering a potential thermal expansion of the pressurization liquid.

As regards the operation, the pressure prevailing within the apparatus according to the invention is controlled directly with the pressure of a gas produced in the electrolytic cell. Since hydrogen and oxygen are produced in the electrolytic cell in volumetric ratio of 2:1, the volumes of the hydrogen storage and the oxygen storage are preferably in the same ratio. It is equally advantageous that the gaseous volumes of the water separators and the hydrogen and oxygen pipes in association therewith are in said ratio.

BRIEF DESCRIPTION OF THE DRAWINGS

The invention is described below in greater detail, referring to the accompanying figures, in which.

DETAILED DESCRIPTION OF THE INVENTION

Figure 1:
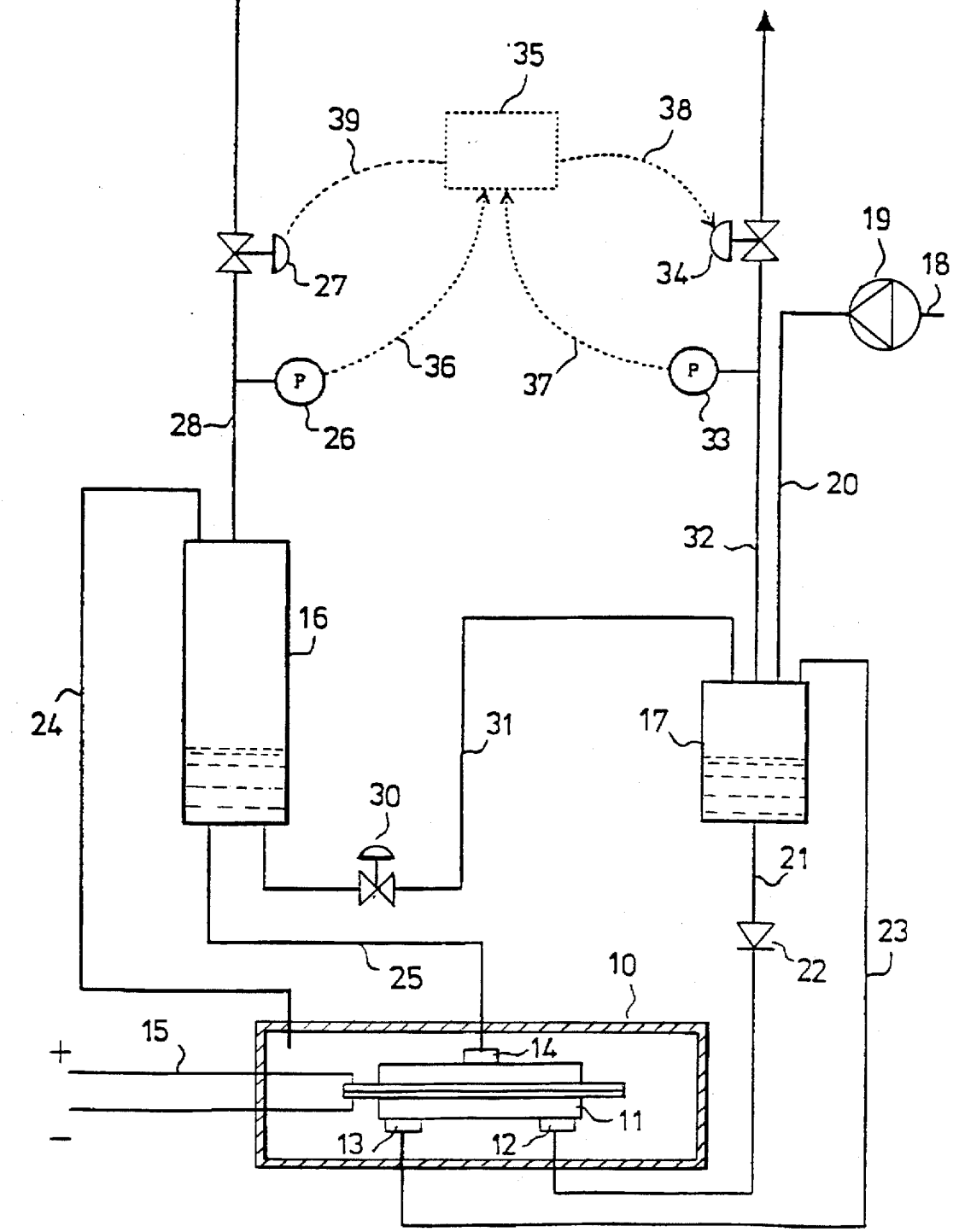
FIG. 1 shows the principal design of an electrolysis apparatus according to the invention in which hydrogen pressure is used for controlling the pressure.

FIG. 1 presents a pressure container 10 serving as a pressure shell. Inside the pressure shell 10, there is placed an electrolytic cell 11 provided with an inlet connector 12 of the electrolytic liquid, with outlet connectors 14 and 13 for hydrogen and oxygen, and respectively with electricity feeding lines 15. The interior of the pressure shell 10 is moreover filled with a liquid, e.g. silicon oil. Electrolytic liquid, such as water, is conducted by means of gravitation into the electrolytic cell 11. The embodiment according to FIG. 1 presents water separators 16 and 17 for separating water from hydrogen and oxygen.

Water is fed into the electrolytic cell 11 from a water pipe 18 and pump 19 through the pressure shell 10 through a water inlet line 20 conducted into the water separator 17 of the oxygen gas and further therefrom through a water inlet line 21 and a back pressure valve 22 positioned therein into an inlet connector 12, and further, into the electrolytic cell 11. The oxygen gas produced in the electrolytic cell 11 is conducted through an oxygen outlet connector 13 and an oxygen outlet line 23 to the water separator 17 of oxygen. The water following the oxygen gas is separated in the water separator 17 and returns into the electrolytic cell 11 through line 21.

The hydrogen gas produced in the electrolytic cell 11 is conducted through a hydrogen outlet connector 14 and a hydrogen outlet line 25 to a water separator 16 of the hydrogen gas. From the water separator 16, a hydrogen outlet line 28 provided with a pressure sensor 26 and a valve 27 leads to a hydrogen gas storage container 29. Further, pipe 24 transmitting pressure is lead from the water separator 16 to the interior space of the pressure shell 10 for pressurizing thereof. In addition, a water pipe 31 provided with a valve 30 is conducted from the water separator 16 of the hydrogen gas to the water separator 17 of the oxygen gas, whereby the water following the hydrogen gas can be returned to the electrolytic cell 11 in the above-described manner.

The oxygen gas is conducted from the water separator 17 to the oxygen outlet line 32 and, further, for instance, into an oxygen container (not shown) when the oxygen is also stored for later use. The oxygen outlet line 32 is provided with a pressure sensor 33 and a valve 34.

The pressure control in the apparatus as shown in FIG. 1 can be accomplished preferably so that a pressure controller 35 has been connected with signal leads 36 and 37 to hydrogen and oxygen pressure sensors 26,33, and according to the signal provided by said pressure sensors 26,33, the pressure controller 35 opens and shuts through signal line 38,39 the valves 34,27 in the oxygen and hydrogen outlet lines 32,28.

Figure 2:
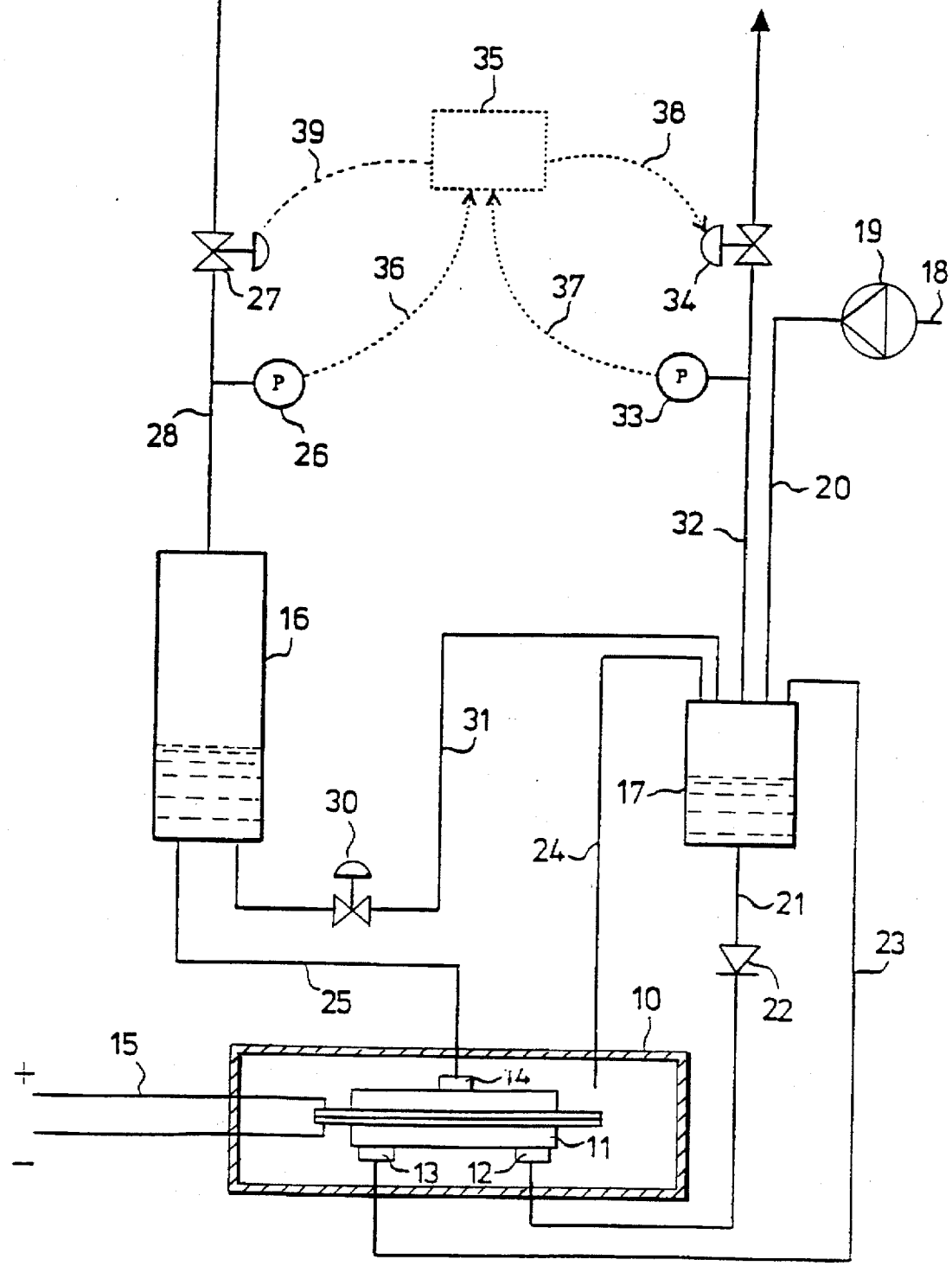
FIG. 2 presents an alternative embodiment in which oxygen pressure is used for controlling the pressure.

FIG. 2 presents an apparatus according to FIG. 1 modified so that oxygen is used for pressurizing. The apparatus according to the invention is otherwise similar as in FIG. 1, except that the oxygen outlet pipe 24 is conducted into the pressure shell 10 from the water separator for oxygen.

The above-described embodiments are intended merely to demonstrate, not to limit, the invention.

We claim:

1. An electrolysis apparatus for producing hydrogen by decomposing electrolytic liquid with the aid of electric current into hydrogen and oxygen in a closed pressurized electrolytic cell (11) placed within a closed pressure shell (10) having an interior filled with a liquid, wherein the electrolytic cell (11) is immersed in the liquid of the liquid-filled interior of the pressure shell and maintained pressurized by means of pressure of a gas produced in the decomposition of the electrolytic liquid, and that the liquid-filled interior of the pressure shell (10) is communicating with a gas source containing pressurized oxygen or hydrogen produced in the electrolytic cell (11) by a pipe line (24) transmitting the pressure of the gas source to the liquid in the pressure shell (10) to pressurize the liquid-filled interior of the pressure shell (10), and wherein the liquid-filled interior of the pressure shell (10) is isolated from an interior of the electrolytic cell (11) in which the electrolytic liquid is decomposed.

2. Electrolysis apparatus according to claim 1, characterized in that said liquid is selected among the following group: silicon oils and fats, fluorized oils, crude or synthetic oils, water and mixtures thereof.

3. An electrolysis apparatus for producing hydrogen by decomposing electrolytic liquid with the aid of electric current into hydrogen and oxygen, comprising a closed pressure shell defining an interior space, said interior space of said pressure shell being filled with a liquid, a closed pressurized electrolytic cell arranged in the liquid of said liquid-filled interior space of said pressure shell and having an interior space such that said interior space of said electrolytic cell is isolated from and not in flow communication with said liquid-filled interior space of said pressure shell, means for directing electrolytic liquid into said electrolytic cell to be decomposed such that pressurized hydrogen and oxygen gas is produced, means for removing the pressurized hydrogen and oxygen gas from said electrolytic cell, and means for pressurizing said liquid-filled interior space of said pressure shell and maintaining the pressurization in said liquid-filled interior space of said pressure shell at a level to obtain the pressurized hydrogen and oxygen from said electrolytic cell, said pressurizing means comprising means for directing at least a portion of the pressurized hydrogen or oxygen gas removed from said electrolytic cell into connection with the liquid in said liquid-filled interior space of said pressure shell.

4. The electrolysis apparatus of claim 3, wherein said means for removing the pressurized hydrogen and oxygen gas from said electrolytic cell comprise a separate conduit leading from said electrolytic cell for each of the pressurized hydrogen and oxygen gas, said pressurizing means comprising means for directing at least a portion of the pressurized hydrogen gas removed from said electrolytic cell into said interior space of said pressure shell.

5. The electrolysis apparatus claim 3, wherein said means for removing the pressurized hydrogen and oxygen gas from said electrolytic cell comprise a separate conduit leading from said electrolytic cell for each of said pressurized hydrogen and oxygen gas, said pressurizing means comprising means for directing at least a portion of the pressurized oxygen gas removed from said electrolytic cell into said interior space of said pressure shell.

6. An electrolysis apparatus for producing hydrogen by decomposing electrolytic liquid with the aid of electric current into hydrogen and oxygen in a closed pressurized electrolytic cell placed within a closed pressure shell having an interior filled with a liquid, wherein the electrolytic cell is maintained pressurized by means of pressure of oxygen produced in the decomposition of the electrolytic liquid, and that the interior of the pressure shell is communicating with a gas source containing pressurized oxygen produced in the electrolytic cell by a pipe line transmitting the pressure of the oxygen gas source to the liquid in the pressure shell to pressurize the interior of the pressure shell, and wherein the interior of the pressure shell is isolated from an interior of the electrolytic cell in which the electrolytic liquid is decomposed, the hydrogen and oxygen produced in the electrolytic cell being conducted into liquid separators for separating the electrolysis liquid from the gases, the separated electrolysis liquid being returned into the electrolytic cell.

7. Electrolysis apparatus according to claim 6, characterized in that at least one of said liquid separators (16 and 17) is placed outside the pressure shell (10).

8. Electrolysis apparatus according to claim 6, characterized in that at least one of said liquid separators (16 and 17) is placed inside the pressure shell (10).

9. An electrolysis apparatus for producing hydrogen by decomposing electrolytic liquid with the aid of electric current into hydrogen and oxygen, comprising a closed pressure shell defining an interior space, said interior space of said pressure shell being filled with silicon oil or silicon fat, a closed pressurized electrolytic cell arranged in said interior space of said pressure shell and having an interior space such that said interior space of said electrolytic cell is isolated from and not in flow communication with said interior space of said pressure shell, means for directing electrolytic liquid into said electrolytic cell to be decomposed such that pressurized hydrogen and oxygen gas is produced, means for removing the pressurized hydrogen and oxygen gas from said electrolytic cell, and means for pressurizing said interior space of said pressure shell and maintaining the pressurization in said interior space of said pressure shell at a level to obtain the pressurized hydrogen and oxygen from said electrolytic cell, said pressurizing means comprising means for directing at least a portion of the pressurized hydrogen or oxygen gas removed from said electrolytic cell into connection with the liquid in said interior space of said pressure shell.

10. An electrolysis apparatus for producing hydrogen by decomposing electrolytic liquid with the aid of electric current into hydrogen and oxygen, comprising a closed pressure shell defining an interior space, said interior space of said pressure shell being filled with a liquid selected from the group consisting of fluorized oils, crude oils, synthetic oils and mixtures thereof, a closed pressurized electrolytic cell arranged in said interior space of said pressure shell and having an interior space such that said interior space of said electrolytic cell is isolated from and not in flow communication with said interior space of said pressure shell, means for directing electrolytic liquid into said electrolytic cell to be decomposed such that pressurized hydrogen and oxygen gas is produced, means for removing the pressurized hydrogen and oxygen gas from said electrolytic cell, and means for pressurizing said interior space of said pressure shell and maintaining the pressurization in said interior space of said pressure shell at a level to obtain the pressurized hydrogen and oxygen from said electrolytic cell, said pressurizing means comprising means for directing at least a portion of the pressurized hydrogen or oxygen gas removed from said electrolytic cell into connection with the liquid in said interior space of said pressure shell.

11. An electrolysis apparatus for producing hydrogen by decomposing electrolytic liquid with the aid of electric current into hydrogen and oxygen, comprising

- a closed pressure shell defining an interior space, said interior space of said pressure shell being filled with a liquid,
- a closed pressurized electrolytic cell arranged in said interior space of said pressure shell and having an interior space such that said interior space of said electrolytic cell is isolated from and not in flow communication with said interior space of said pressure shell,
- means for directing electrolytic liquid into said electrolytic cell to be decomposed such that pressurized hydrogen and oxygen gas is produced,
- means for removing the pressurized hydrogen and oxygen gas from said electrolytic cell, said means for removing the pressurized hydrogen and oxygen gas from said electrolytic cell comprising a separate conduit leading from said electrolytic cell for each of said pressurized hydrogen and oxygen gas,
- means for pressurizing said interior space of said pressure shell and maintaining the pressurization in said interior space of said pressure shell at a level to obtain the pressurized hydrogen and oxygen from said electrolytic cell, said pressurizing means comprising means for directing at least a portion of the pressurized hydrogen or oxygen gas removed from said electrolytic cell into connection with the liquid in said interior space of said pressure shell,
- a liquid separator in flow communication with each of said conduits leading from said electrolytic cell for separating the electrolysis liquid from a respective one of the pressurized hydrogen and oxygen gas, and
- conduit means for returning the separated electrolysis liquid into said electrolytic cell.

12. The electrolysis apparatus of claim 11, wherein at least one of said liquid separator is placed outside said pressure shell.

13. The electrolysis apparatus of claim 11, wherein at least one of said liquid separator is placed inside said pressure shell.

14. The electrolysis apparatus of claim 11, wherein said conduit means comprising a line connecting said liquid separators to each other.

* * * * *